(12) United States Patent
Lenig (10) Patent No.: US 9,307,622 B2
(45) Date of Patent: Apr. 5, 2016

(54) THREE-WAY SWITCHING CIRCUIT HAVING DELAY FOR INRUSH CURRENT PROTECTION

(71) Applicant: Lutron Electronics Co., Inc., Coopersburg, PA (US)

(72) Inventor: Robert William Lenig, Bethlehem, PA (US)

(73) Assignee: LUTRON ELECTRONICS CO., INC., Coopersburg, PA (US)

( * ) Notice: Subject to any disclaimer, the term of this patent is extended or adjusted under 35 U.S.C. 154(b) by 0 days.

(21) Appl. No.: 14/832,610

(22) Filed: Aug. 21, 2015

(65) Prior Publication Data

US 2016/0057841 A1  Feb. 25, 2016

Related U.S. Application Data

(60) Provisional application No. 62/040,473, filed on Aug. 22, 2014.

(51) Int. Cl.
*H05B 33/08* (2006.01)
*H05B 37/02* (2006.01)

(52) U.S. Cl.
CPC ........ *H05B 37/0281* (2013.01); *H05B 33/0815* (2013.01); *H05B 33/0845* (2013.01); *H05B 33/0887* (2013.01)

(58) Field of Classification Search
None
See application file for complete search history.

(56) References Cited

U.S. PATENT DOCUMENTS

| | | | |
|---|---|---|---|
| 3,558,910 A | 1/1971 | Dale et al. | |
| 3,639,808 A | 2/1972 | Ritzow | |
| 4,772,809 A | 9/1988 | Koga et al. | |
| 4,788,415 A | 11/1988 | Whipple, Jr. | |
| 4,855,612 A | 8/1989 | Koga et al. | |
| 4,885,654 A | 12/1989 | Budyko et al. | |
| 5,309,068 A | 5/1994 | Hakkarainen et al. | |
| 5,508,878 A * | 4/1996 | Pecore ................... | G04G 15/00 307/140 |
| 5,633,540 A | 5/1997 | Moan | |
| 5,790,354 A | 8/1998 | Altiti et al. | |
| 7,110,255 B2 | 9/2006 | Ko et al. | |
| 8,274,240 B2 | 9/2012 | Salvestrini | |
| 8,278,839 B2 | 10/2012 | Salvestrini et al. | |

* cited by examiner

*Primary Examiner* — Douglas W Owens
*Assistant Examiner* — Dedei K Hammond
(74) *Attorney, Agent, or Firm* — Condo Roccia Koptiw LLP (57) ABSTRACT

A three-way load control device may be coupled to a circuit including an AC power source, an electrical load, and an external single-pole double-throw (SPDT) three-way switch. The load control device may include a three-way switching circuit comprising an internal SPDT switch, a relay coupled to the internal SPDT switch, a turn-on delay circuit responsive to a voltage at a movable contact of the internal SPDT switch, and a turn-off delay circuit responsive to voltages at fixed contacts of the internal SPDT switch. The turn-on delay circuit renders the relay conductive after a turn-on delay from when either the internal SPDT switch or the external three-way switch is actuated to turn the electrical load on. The turn-off delay circuit renders the relay non-conductive after a turn-off delay from when either the internal SPDT switch or the external three-way switch is actuated to turn off the electrical load.

37 Claims, 3 Drawing Sheets

Fig. 3

THREE-WAY SWITCHING CIRCUIT HAVING DELAY FOR INRUSH CURRENT PROTECTION

CROSS-REFERENCE TO RELATED APPLICATIONS

This application claims the benefit of U.S. Provisional Application No. 62/040,473, filed Aug. 22, 2014, which is incorporated by reference herein as if fully set forth.

BACKGROUND

A light source may be driven by an appropriate driver, such as a light-emitting diode (LED) driver or ballast, in order to control (e.g., illuminate) the light source. For example, a LED light source may be driven by a LED driver circuit to turn the LED light source on or off. A fluorescent lamp may be driven by a ballast to turn the fluorescent lamp on or off. A driver may be used to control the intensity of a light source, for example, to dim the light source. For instance, the driver may use zero-to-ten-volt (0-10V) control to vary the intensity of the light source. Zero-to-ten-volt control may sometimes be referred to as 1-10V control. A 0-10V driver receives power from an AC power source. An external mechanical switch may be coupled between the AC power source and the 0-10V driver, for example to provide a switched-hot voltage to the driver.

A 0-10V control device may provide a 0-10V control signal to the 0-10V driver, such that the 0-10V driver may control the intensity of the light source accordingly. The 0-10V control device may be an external device. Often, the 0-10V control device is mounted in an electrical wall box and comprises an intensity adjustment actuator (e.g., a slider control). The 0-10V control device regulates the direct-current (DC) voltage level of the 0-10V control signal provided to the driver. For example, the 0-10V control device may set the DC voltage level between a substantially low voltage (e.g., 0-1 V) to a maximum voltage (e.g., approximately 10 V). The 0-10V control device may select the DC voltage level in response to an actuation of an intensity adjustment actuator by a user who may adjust the intensity adjustment actuator to indicate a desired intensity for the light source.

A driver may act as a capacitive load, for example, when power is applied to the driver. Due to the capacitive nature of the driver, there may be a large in-rush of current into the driver when a mechanical switch is closed to turn on a light source. The in-rush current may quickly subside as the input capacitance of the driver charges up to line voltage. However, a temporary current surge can be problematic as the number of drivers controlled by a mechanical switch increases. For example, in the case of a full 16-amp (e.g., steady-state) circuit of drivers, the in-rush current can approach 560 amps. Although the in-rush current may be short-lived (e.g., only a few line cycles or shorter), such high current surges can wreak havoc on the contacts of even a relatively large relay with a high current rating (e.g., 50 amps).

A large in-rush current may be problematic because it may deteriorate the contacts of a mechanical switch in a relay. The contacts of a mechanical switch have a tendency to bounce apart when the switch is closed and when the contacts bounce apart during a large current surge, the intervening medium (e.g., gas or air) between the contacts may ionize. Although the intervening medium may be nonconductive, a high current surge may cause the nonconductive medium to become conductive. When the medium becomes conductive, the in-rush current may flow from one contact to another even though the contacts may not be touching each other. This phenomenon may be referred to as arcing. The contacts may be coated with a conductive material, for example, to improve the conductivity of the relay and arcing between the contacts may inadvertently cause some of the coating to be removed, for example, by blasting away the conductive coatings. A significant removal of the conductive coating from the relay contacts may eventually cause the relay to fail. For example, the relay may fail due to erosion of the contact material, or due to welding of the contacts in the closed position.

Some prior art lighting control systems including 0-10V drivers have required heavy-duty mechanical switches that can be physically large and costly. Also, physically large mechanical switches may be too large to fit in a single electrical wall box. Hence, physically large mechanical switches may need to be mounted in an enclosure separate from the 0-10V control device. An example of a prior art 0-10V control device that requires an externally-mounted relay is the Nova T-Star® 0-10V Control, model number NTFTV, manufactured by Lutron Electronics Co., Inc.

Other prior art switching circuits for drivers have required advanced components and structures, for example microcontrollers and multiple relays per driver circuit. Also, some prior art switching circuits for drivers have required complex wiring topologies, for example requiring a neutral connection. An example of such a switching circuit is described in greater detail in commonly-assigned U.S. Pat. No. 5,309,068, issued May 3, 1994, entitled TWO RELAY SWITCHING CIRCUIT FOR FLUORESCENT LIGHTING CONTROLLER, and U.S. Pat. No. 5,633,540, issued May 27, 1999, entitled SURGE-RESISTANT RELAY SWITCHING CIRCUIT. The entire disclosures of both patents are hereby incorporated by reference.

Some prior art 0-10V control devices are able to fit in a single electrical wallbox and provide both the switched hot voltage and the 0-10V control signal to a 0-10V ballast, as described in commonly-assigned U.S. Pat. No. 8,274,240, issued Sep. 25, 2012, and U.S. Pat. No. 8,278,839, issued Oct. 2, 2012, both entitled SWITCHING CIRCUIT HAVING DELAY FOR INRUSH CURRENT PROTECTION, the entire disclosures of which are hereby incorporated by reference. However, these prior art 0-10V control devices can only be used in a two-wire lighting system, not a three-wire lighting system.

The prior art two-wire control devices cannot be used in a three-wire lighting system because they cannot be connected to an external three-way switch. An external three-way switch has three terminals. One of the three terminals of the external three-way switch may be connected to either an alternating current (AC) power source or an electrical load. But the remaining two terminals of the external three-way switch must be connected to a switching circuit of a load control device. A prior art two-wire control device has two terminals. One of the two terminals of the prior art two-wire control device may be connected to either the AC power source or the electrical load and the remaining one terminal may be connected to an external switch. Due to the mismatch in the number of available terminals, the prior art two-wire control device cannot be connected to the external three-way switch. Hence, the prior art two-wire control device cannot be used in a three-wire lighting system.

Therefore, there is a need for a switching circuit that can be used in a three-way lighting system, can handle a large inrush current, and does not require a neutral connection or a heavy-duty mechanical switch or relay.

SUMMARY

The present disclosure may relate to a load control system for controlling the amount of power delivered to an electrical load, such as a lighting load, and more particularly, to a switching circuit for a three-way load control device for controlling a load regulation device, such as a light-emitting diode (LED) driver for an LED light source, via a control signal, such as a 0-10V control signal.

A three-way load control device may be coupled to a circuit including an AC power source, an electrical load, and an external single-pole double-throw (SPDT) three-way switch. The three-way switch may comprise a first fixed contact, a second fixed contact, and a movable contact. The three-way switch may be adapted to be coupled to either the power source or the electrical load. The three-way switch may have a first state in which the movable contact is contacting the first fixed contact and a second state in which the movable contact is contacting the second fixed contact. The load control device may comprise a first load terminal adapted to be coupled to either the power source or the electrical load to which the three-way switch is not coupled, a second load terminal adapted to be coupled to the first fixed contact of the three-way switch, a third load terminal adapted to be coupled to the second fixed contact of the three-way switch, and a three-way switching circuit.

The switching circuit may comprise an internal SPDT switch having a movable contact and two fixed contacts coupled to the respective second and third load terminals, a relay having a first mechanical switch coupled in series between the first load terminal and the movable contact of the internal SPDT switch, a turn-on delay circuit responsive to a voltage at the movable contact of the internal SPDT switch, and a turn-off delay circuit responsive to voltages at both of the fixed contacts of the internal SPDT switch. The turn-on delay circuit is configured to render the relay conductive after a turn-on delay from when either the internal SPDT switch or the external three-way switch is actuated to turn on the electrical load. The turn-off delay circuit configured to render the relay non-conductive after a turn-off delay from when either the internal SPDT switch or the external three-way switch is actuated to turn off the electrical load.

Other features and advantages of the present invention will become apparent from the following description of the invention that refers to the accompanying drawings.

DETAILED DESCRIPTION

Figure 1:
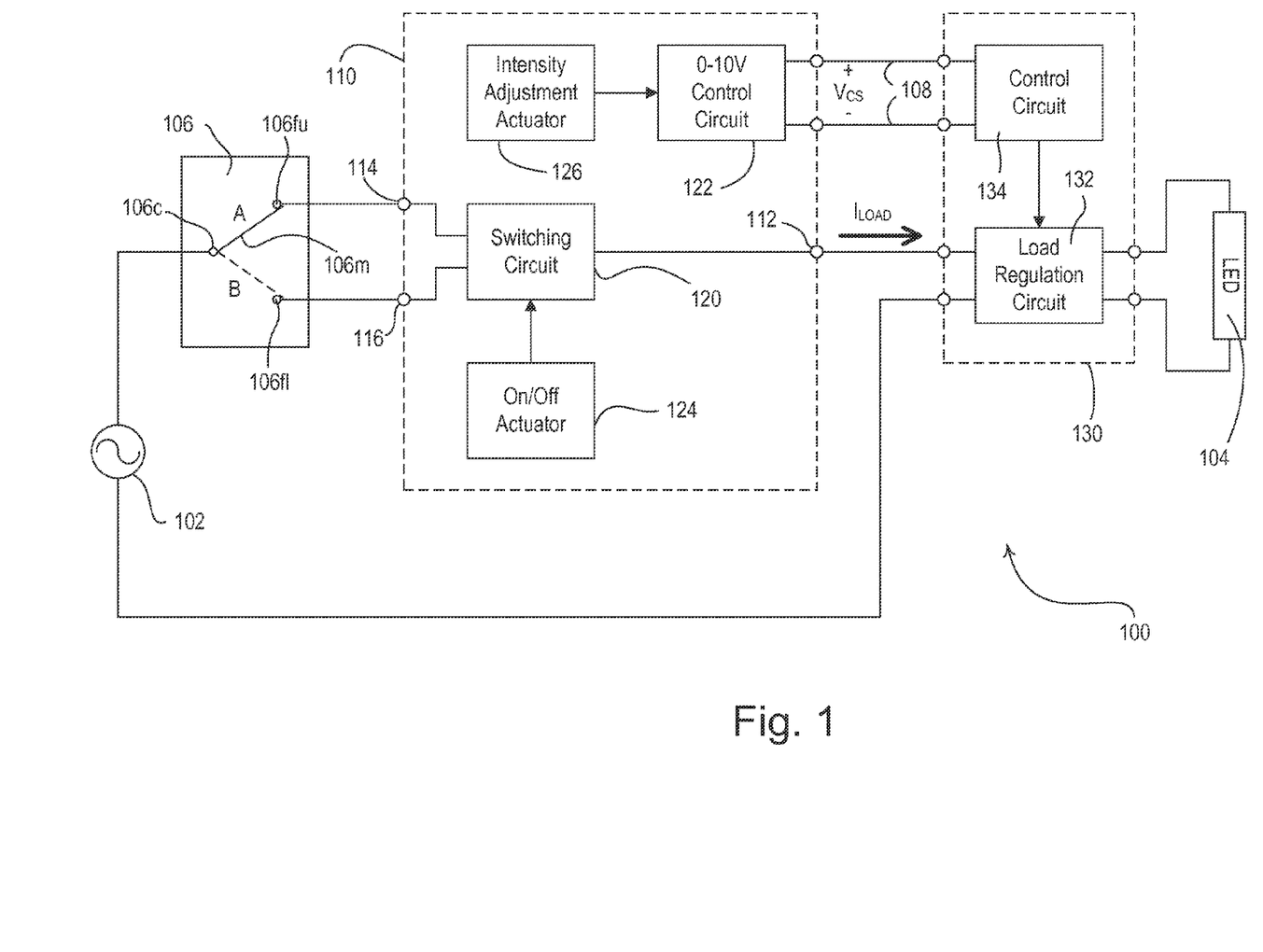
FIG. 1 is a perspective view of an example three-way load control device having a three-way 0-10V load control device.

FIG. 1 is a simplified block diagram of an example three-way load control system 100. The system 100 may include an alternating current (AC) power source 102 and an electrical load. The electrical load may be a light source (e.g., LED light source 104). The system 100 may include an external three-way switch 106 and a three-way 0-10V load control device 110. The 0-10V control device 110 may control the intensity of the electrical load. For example, the 0-10V control device 110 may control a brightness level of the LED light source 104. The system 100 may include a 0-10V LED driver 130. The 0-10V LED driver 130 may be used to control the operation of the light source 104. For example, the 0-10V LED driver 130 may be used to turn the light source 104 on or off. The 0-10 LED driver 130 may be used to vary an intensity of the light source 104.

The 0-10V control device 110 and the three-way switch 106 may be coupled in series between the AC power source 102 and the 0-10V LED driver 130. The 0-10V control device 110 may controllably conduct a load current $I_{LOAD}$ from the AC power source 102 to the LED driver 130. The 0-10 v control device 110 may be coupled with the LED driver 130 via control wiring 108. The 0-10V control device 110 may be configured to generate a control signal $V_{CS}$. The 0-10V control device 110 may send the control signal $V_{CS}$ to the 0-10V LED driver 130 via the control wiring 108. The control signal $V_{CS}$ may include a 0-10V control signal or an intensity control signal. The control signal $V_{CS}$ may be used for controlling the intensity of the LED light source 104. The 0-10V LED driver 130 controls the intensity of the LED light source 104 in response to the control signal $V_{CS}$ provided by the 0-10V control device 110.

The three-way switch 106 includes a movable contact 106m that is electrically connected to the AC power source 102, for example, as shown in FIG. 1. The movable contact 106m may be referred to as a common contact. The three-way switch 106 includes two fixed contacts, for example an upper fixed contact 106fu and a lower fixed contact 106fl. The three-way switch 106 may be a single-pole double-throw (SPDT) switch and the movable contact 106m may be referred to as a pole of the SPDT switch. When the movable contact 106m is making contact with the upper fixed contact 106fu, the three-way switch 106 is in position A. When the movable contact 106m is making contact with the lower fixed contact 106fl, the three-way switch 106 is in position B.

The 0-10V control device 110 includes a terminal 112 that is coupled to the LED driver 130 and terminals 114, 116 that are connected to two fixed contacts of the three-way switch 106. The terminals 112, 114 and/or 116 may be referred to as load terminals. A common terminal 106c of the three-way switch 106 is coupled to the AC power source 102 for receiving an AC line voltage of the AC power source 102. As shown in FIG. 1, the 0-10V control device 110 is coupled to the load-side of the load control system 100. Alternatively, the 0-10V control device 110 could be connected on the line-side of the load control system 100 with the three-way switch 106 on the load-side. Examples of three-way switching circuits and load control systems are described in greater detail in commonly-assigned U.S. Pat. No. 7,847,440, issued Dec. 7, 2010, entitled LOAD CONTROL DEVICE FOR USE WITH LIGHTING CIRCUITS HAVING THREE-WAY SWITCHES, the entire disclosure of which is hereby incorporated by reference.

The 0-10V control device 110 may comprise a switching circuit 120 and a 0-10V control circuit 122. The 0-10V control device 110 may be mounted in a single electrical wallbox. The switching circuit 120 may not require a connection to the neutral side of the AC power source 102. The switching circuit 120 may be coupled in series between the terminal 112 and the terminals 114, 116 of the 0-10V control device 110. As shown in FIG. 1, the neutral side of the AC power source 102 is connected to the 0-10V LED driver 130. The neutral side of the AC power source 102 may not be connected to the 0-10V control device 110. The switching circuit 120 may selectively conduct the load current $I_{LOAD}$ from the AC power source 102 to the 0-10V LED driver 130, for example, in response to actuations of an on/off actuator 124 (e.g., a toggle switch). The on/off actuator 124 could be a mechanical switch that may be actuated by a slider control. The on/off actuator 124 may include a slide-to-off slider control. For example, an off position of the on/off actuator 125 may correspond with the slider control reaching a minimum position.

The 0-10V control device 110 may include an intensity adjustment actuator 126. The intensity adjustment actuator 126 may be actuated by a user to indicate a desired intensity of the LED light source 104. The intensity adjustment actuator 126 may be a slider control. The 0-10V control circuit 122 may provide the 0-10V control signal $V_{CS}$ to the 0-10V LED driver 130 across the control wiring 108. The 0-10V control circuit 122 may vary the DC magnitude of the 0-10V control signal $V_{CS}$ in response to an actuation of the intensity adjustment actuator 126. The switching circuit 120 may conduct the load current $I_{LOAD}$ to the 0-10V LED driver 130. The 0-10V LED driver 130 may be configured to illuminate the LED light source 104 when the switching circuit 120 is conductive. The 0-10V LED driver 130 may adjust the intensity of the LED light source 104 based on the magnitude of the 0-10V control signal $V_{CS}$. The 0-10V LED driver 130 may not be energized and the LED light source 104 may be off when the switching circuit 120 is non-conductive (e.g., not conducting load current $I_{LOAD}$).

The 0-10V LED driver 130 may comprise a load regulation circuit 132 (e.g., an LED drive circuit). The load regulation circuit 132 may be used for driving the LED light source 104. The 0-10V LED driver 130 may comprise a control circuit 134. The control circuit 134 may receive the 0-10V control signal $V_{CS}$ from the 0-10V control device 110. The control circuit 134 may control the load regulation circuit 132. The control circuit 134 may control the intensity of the LED light source 104 based on the magnitude of the 0-10V control signal $V_{CS}$. The control circuit 134 may control the intensity of the LED light source 104 via the load regulation circuit 132.

The control circuit 134 may be configured to adjust the intensity of the LED light source 104 between a low-end intensity $L_{LE}$ (e.g., minimum intensity) and a high-end intensity $L_{HE}$ (e.g., maximum intensity). The control circuit 134 may set the LED light source 104 to the low-end intensity $L_{LE}$ when the 0-10V control signal $V_{CS}$ has a magnitude that is at or below a threshold (e.g., approximately 0 V). The control circuit 134 may set the LED light source 104 to the high-end intensity $L_{HE}$ when the 0-10V control signal $V_{CS}$ has a magnitude that is at or above a threshold (e.g., 10 V). The control circuit 134 may set the LED light source 104 to an intensity that is scaled between the low-end intensity $L_{LE}$ and the high-end intensity $L_{HE}$ when the 0-10V control signal $V_{CS}$ has a magnitude between zero and ten volts. The scaling may be based on a scaling mode, for example, a linear or non-linear scaling mode.

The load regulation circuit 132 may be configured to control the intensity of the LED light source 104. The load regulation circuit 132 may control the intensity of the LED light source 104 by regulating the voltage generated across the LED light source 104. The load regulation circuit 132 may control the intensity of the LED light source 104 by regulating the current conducted through the LED light source 104. The load regulation circuit 132 may use voltage regulation and/or current regulation to control the intensity of the LED light source 104. For example, the load regulation circuit 132 may use voltage regulation and/or current regulation to control the intensity of the LED light source 104. Examples of LED drivers are described in greater detail in commonly-assigned U.S. Pat. No. 8,492,987, issued Jul. 23, 2013, entitled LOAD CONTROL DEVICE FOR A LIGHT-EMITTING DIODE LIGHT SOURCE, and U.S. Patent Application Publication No. 2014/0009084, published Jan. 9, 2014, entitled FORWARD CONVERTER HAVING A PRIMARY-SIDE CURRENT SENSE CIRCUIT, the entire disclosures of which are hereby incorporated by reference. The 0-10V LED driver 130 may be an electronic ballast for driving a fluorescent lamp, for example, in an alternative embodiment.

Figure 2:
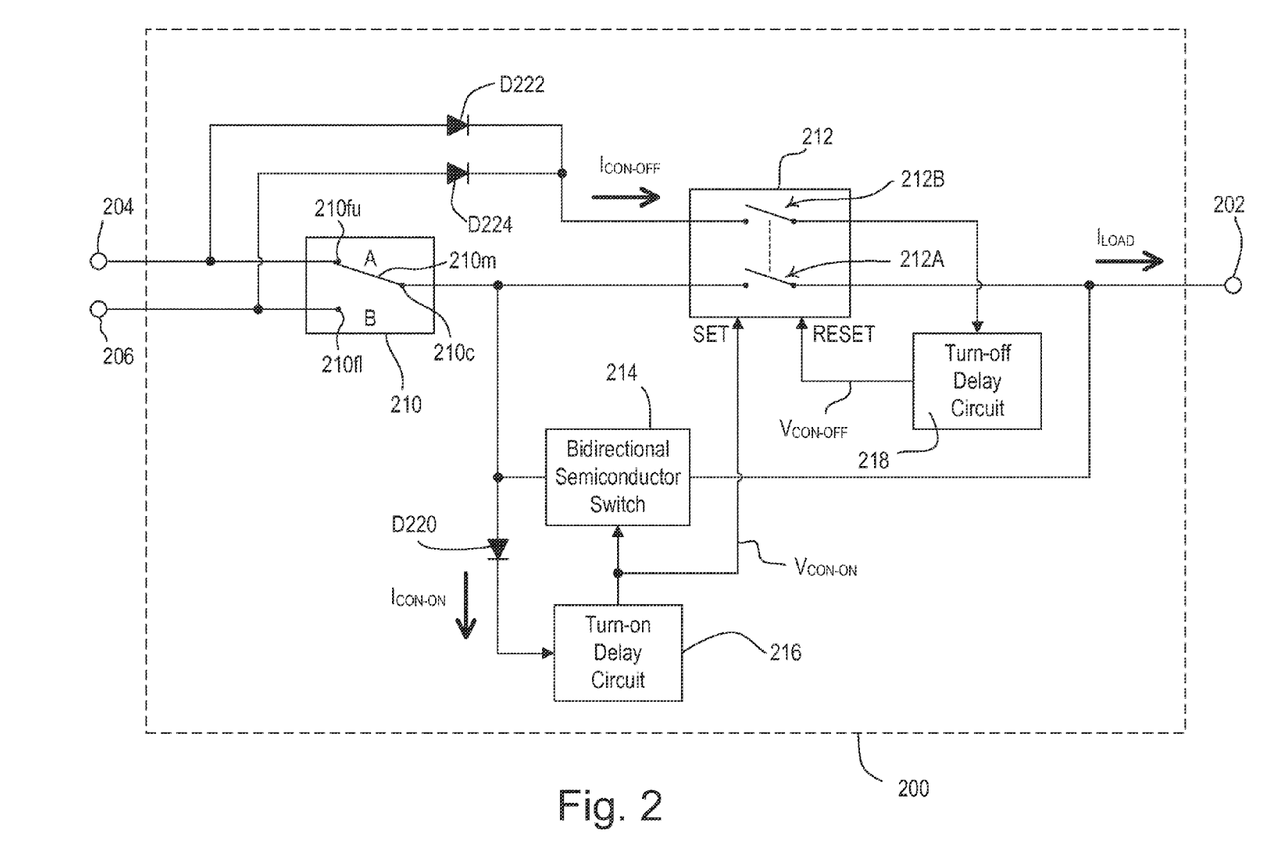
FIG. 2 is a simplified block diagram of an example three-way switching circuit.

FIG. 2 is a simplified block diagram of an example three-way switching circuit 200. The switching circuit 200 may be an example of the switching circuit 120 of the 0-10V control device 110 shown in FIG. 1. The switching circuit may be used for turning on and/or off an electrical load (e.g., 0-10V LED driver 130 and/or the LED light source 104). The switching circuit 200 may comprise three terminals 202, 204 and 206, a mechanical single-pole double-throw (SPDT) switch 210, a controllably conductive device (e.g., relay 212), a bidirectional semiconductor switch 214, a turn-on delay circuit 216, and/or a turn-off delay circuit 218.

The switching circuit 200 may be installed in a three-way control system (e.g., the three-way control system 100 of FIG. 1) with a standard three-way switch (e.g., three-way switch 106). The switching circuit 200 may be coupled between a load terminal (e.g., terminal 112) and two other terminals (e.g., switch terminals 114, 116). For example, terminal 202 of the switching circuit 200 may be connected to terminal 112 of the 0-10V control device 110 and terminals 204, 206 may be connected to terminals 114, 116 of the 0-10V control device 110.

The SPDT switch 210 may be switched between a position A and a position B by a mechanical actuator (e.g., on/off actuator 124). The SPDT switch 210 may have two fixed contacts, for example an upper fixed contact 210*fu* and a lower fixed contact 210*fl*. The upper fixed contact 210*fu* and the lower fixed contact 210*fl* may be coupled to load terminals 204, 206, respectively. The SPDT switch 210 may include a movable contact 210*m*. The movable contact 210*m* may be referred to as a pole. The SPDT switch 210 is in position A when the movable contact 210*m* makes contact with the upper fixed contact 210*fu*. The SPDT switch 210 is in position B when the movable contact 210*m* makes contact with the lower fixed contact 210*fl*. The SPDT switch 210 may be referred to as an internal switch, for example because the SPDT switch 210 is a part of the switching circuit 200.

The relay 212 may be a double-pole single-throw (DPST) latching relay. The relay 212 may include a mechanical switch 212A coupled in series electrical connection between a common contact of the SPDT switch 210 and the load terminal 202. An electrical load (e.g., 0-10V LED driver 130) may be energized when the mechanical switch 212A is closed and the SPDT switch 210 is in the appropriate position. For example, the electrical load may be energized when the electrical circuit is completed through the three-way switch 106 between the AC power source 102 and the 0-10V control device 200. The relay 212 may include another mechanical switch 212B. The mechanical switches 212A, 212B may be synchronized. For example, the mechanical switches 212A, 212B may simultaneously open and close. The mechanical switches 212A, 212B may be a part of two different relays. The mechanical switches 212A, 212B may operate in sync even when they are a part of two different relays. The relay 212 may have a hardware delay, which may be the time it takes for the mechanical switches 212A, 212B to move between their open and closed positions.

The bidirectional semiconductor switch 214 may be coupled in parallel with the first mechanical switch 212A of the relay 212. The bidirectional semiconductor switch 214 may comprise any suitable type of bidirectional semiconductor switch. For example, the bidirectional semiconductor switch 214 may include a thyristor. The thyristor may be a triac or two silicon-controlled rectifiers (SCRs) in anti-parallel connection. The bidirectional semiconductor switch 214 may include a field effect transistor (FET) or an insulated gate bipolar transistor (IGBT) in a full-wave rectifier bridge. The bidirectional semiconductor switch 214 may include two FETs in anti-series connection or two IGBTs in anti-series connection.

The turn-on delay circuit 216 may be coupled to the common contact 210c of the SPDT switch 210 through a diode D220. The turn-on delay circuit 216 renders the relay 212 conductive after a turn-on delay from when either the SPDT switch 210 is actuated to turn on the electronic load or the external three-way switch 106 is actuated to turn on the electrical load. In addition to the turn-on delay, there may a hardware delay associated with the relay 212. The turn-on delay circuit 216 may detect that either the SPDT switch 210 or the external three-way switch 106 is actuated to turn on the electrical load. The turn-on delay circuit 216 may initiate a turn-on delay time $T_{DELAY-ON}$, for example, in response to detecting the actuation of either the SPDT switch 210 or the external three-way switch 106. The turn-on delay circuit 216 may render the relay 212 conductive after the turn-on delay time $T_{DELAY-ON}$ expires. The turn-on delay circuit 216 may render the relay conductive by causing the mechanical switches 212A and/or 212B to close, for example by sending a signal to a SET input of the relay 212.

Delaying the passage of the load current $I_{LOAD}$ through the relay 212 may provide sufficient time for the movable contacts of mechanical switches 212A, 212B to stop bouncing, and as such, arcing at the mechanical switches 212A, 212B can be averted. The turn-on delay time $T_{DELAY-ON}$ may be configured, for example, by varying the values of one or more components of the turn-on delay circuit 216. For example, the turn-on delay time $T_{DELAY-ON}$ may be increased by increasing the capacitance of the capacitor and/or may be decreased by decreasing the capacitance of the capacitor.

The turn-on delay circuit 216 may be configured to generate a turn-on signal $V_{CON-ON}$ for rendering the bidirectional semiconductor switch 214 and the switches 212A, 212B of the relay 212 conductive. The turn-on signal $V_{CON-ON}$ may be coupled to a SET input of the relay 212. When the SPDT switch 210 or the three-way switch 106 is actuated to turn on the LED light source 104, the electrical circuit is completed through the three-way switch 106 between the AC power source 102 and the 0-10V control device 110. Upon receiving the input to turn on the LED light source 104, the turn-on delay circuit 216 may conduct a turn-on delay control current $I_{CON-ON}$ through either of the switch terminals 204, 206 based on the position of the SPDT switch 210. The turn-on delay control current $I_{CON-ON}$ may be conducted through terminal 204, for example if the SPDT switch 210 is in position A. The turn-on delay control current $I_{CON-ON}$ may be conducted through terminal 206, for example if the SPDT switch 210 is in position B.

The turn-on delay control current $I_{CON-ON}$ may have an appropriately small magnitude. For example, the turn-on delay control current $I_{CON-ON}$ may be less than approximately 10 mA. The turn-on delay control current $I_{CON-ON}$ may be selected such that no arcing occurs at the contacts of the SPDT switch 210 as the movable contact bounces. The turn-on delay control current $I_{CON-ON}$ may have a magnitude that is smaller (e.g., significantly smaller, for example by an order of magnitude) than a magnitude of the load current $I_{LOAD}$.

After a predetermined turn-on delay time $T_{DELAY-ON}$ from when the turn-on delay control current $I_{CON-ON}$ begins to flow, the turn-on delay circuit 216 may drive the turn-on signal $V_{CON-ON}$ high to render the bidirectional semiconductor switch 214 conductive. The turn-on delay time $T_{DELAY-ON}$ may be selected to a value such that the magnitude of the line voltage of the AC power source 102 is approximately 120 $V_{RMS}$. For example, the turn-on delay time $T_{DELAY-ON}$ may be 24 milliseconds. The turn-on delay control current $I_{CON-ON}$ may begin to flow when the SPDT switch 210 or the three-way switch 106 is actuated to turn on the LED light source 104. The bidirectional semiconductor switch 214 may conduct current from the AC power source 102 to the 0-10V LED driver 130 before the relay 212 is rendered conductive. The bidirectional semiconductor switch 214 may conduct the large inrush current initially drawn by the 0-10V LED driver 130, for example because the bidirectional semiconductor switch 214 is conductive before the relay 212 is rendered conductive. The turn-on delay time $T_{DELAY-ON}$ provides sufficient time for the SPDT switch 210 to fully close. After the turn-on delay time $T_{DELAY-ON}$ passes, the SPDT switch 210 is fully closed and the movable contact of the SPDT switch 210 is not bouncing thereby avoiding arcing at the contacts of the SPDT switch 210. The turn-on delay time $T_{DELAY-ON}$ may be configurable and may have a different value when the line voltage has a different magnitude.

The turn-on signal $V_{CON-ON}$ may be received at the SET input of the relay 212. The mechanical switches 212A, 212B may be rendered conductive after a hardware delay (e.g., approximately 15 msec) from when the bidirectional semiconductor switch 214 became conductive. When the mechanical switches 212A, 212B of the relay 212 become conductive, the voltage across the bidirectional semiconductor switch 214 may become approximately zero volts and the bidirectional semiconductor switch 214 may become non-conductive. The bidirectional semiconductor switch 214 may be rendered conductive long enough to conduct the inrush current of the 0-10V LED driver 130. After the inrush current subsides, the relay 212 may be maintained conductive to conduct the load current $I_{LOAD}$ while the LED light source 104 is energized. The mechanical switches 212A, 212B of the latching relay 212 may remain conductive until the electrical circuit between the AC power source 102 and the 0-10V control device 110 is interrupted. For example, the mechanical switches 212A, 212B of the latching relay 212 may remain conductive until either the SPDT switch 210 or the three-way switch 106 is actuated to turn off the LED light source 104.

The turn-off delay circuit 218 may be coupled to the switch terminals 204, 206 through the mechanical switch 212B of the relay 212 and respective diodes D222, D224. The turn-off delay circuit 218 may render the relay 212 non-conductive after a turn-off delay from when either the internal SPDT switch 210 is actuated to turn off the electrical load or the external three-way switch 106 is actuated to turn off the electrical load. The turn-off delay circuit 218 may receive an input to switch an electrical load from an ON position to an OFF position. For example, the turn-off delay circuit 218 may detect that either the SPDT switch 210 or the external three-way switch 106 is actuated to turn off the electrical load. In response to detecting the actuation of either the SPDT switch 210 or the external three-way switch 106, the turn-off delay circuit 218 may initiate a turn-off delay time $T_{DELAY-ON}$. The flow of the load current $I_{LOAD}$ through the relay 212 may be interrupted but the mechanical switches 212A, 212B may still remain closed until the turn-off delay time $T_{DELAY-ON}$ expires.

When the turn-off delay time $T_{DELAY-ON}$ expires, the mechanical switches 212A, 212B may be opened to render the relay 212 non-conductive. By leaving the mechanical switches 212A, 212B closed until the turn-off delay passes, sufficient time is provided for the load current LOAD to subside. Since the mechanical switches 212A, 212B are opened when the load current $I_{LOAD}$ has subsided, the risk of arcing at the mechanical switches 212A, 212B is mitigated. The turn-off delay circuit 218 may cause the mechanical switches 212A and/or 212B to open and render the relay 212 non-conductive by sending a signal to a RESET input of the relay 212. The turn-off delay time $T_{DELAY-ON}$ may be configured by varying one or more components of the turn-off delay circuit 218. For example, the turn-off delay time $T_{DELAY-ON}$ may be increased by increasing the capacitance of the capacitor and/or decreased by decreasing the capacitance of the capacitor.

While the LED light source 104 is energized, the second mechanical switch 212B may be rendered conductive to couple the turn-off delay circuit 218 to the switch terminals 204, 206 through the respective diodes D222, D224. When either the SPDT switch 210 or the three-way switch 106 is actuated to turn off the LED light source 104 and interrupt the electrical circuit between the AC power source 102 and the 0-10V control device 110, the first mechanical switch 212A of the relay 212 and the bidirectional semiconductor switch 214 may no longer be able to conduct the load current $I_{LOAD}$. However, the turn-off delay circuit 218 may be able to conduct a turn-off delay control current $I_{CON-OFF}$. The turn-off delay circuit 218 may conduct the turn-off delay control current $I_{CON-OFF}$ from the AC power source 102 and through one of the switch terminals 204, 206 based on the position of the three-way switch 206.

The turn-off delay control current $I_{CON-OFF}$ may have a small magnitude (e.g., less than approximately 10 mA), such that no arcing occurs at the contacts of the SPDT switch 210. The magnitude of the turn-off delay control current $I_{CON-OFF}$ may be smaller (e.g., significantly smaller, for example by an order of magnitude) than the magnitude of the load current $I_{CON-OFF}$. The turn-off delay circuit 216 may be configured to generate a turn-off signal $V_{CON-OFF}$. The turn-off signal $V_{CON-OFF}$ may be coupled to a RESET input of the relay 212. The turn-off signal $V_{CON-OFF}$ may render the switches 212A, 212B of the relay 212 non-conductive. In response to the turn-off delay expiring, the turn-off delay circuit 216 can send the turn-off signal $V_{CON-OFF}$ to the RESET input of the relay 212 and cause the mechanical switches 212A, 212B to open, thereby rendering the relay 212 non-conductive. Delaying the opening of mechanical switches 212A, 212B may prevent arcing because when the mechanical switches 212A, 212B are opened sufficient time has passed for the load current $I_{LOAD}$ to subside.

The turn-off delay control current $I_{CON-OFF}$ may begin to flow in response to the SPDT switch 210 or the three-way switch 106 being actuated to turn off the LED light source 104. After a predetermined turn-off delay time $T_{DELAY-OFF}$ from when the turn-off delay control current $I_{CON-OFF}$ begins to flow, the turn-off delay circuit 218 may reset the relay 212. Resetting the relay 212 may render the mechanical switches 212A, 212B non-conductive. $T_{DELAY-OFF}$ may be configured to a time such that the magnitude of the line voltage of the AC power source 102 is approximately 120 $V_{RMS}$. For example, $T_{DELAY-OFF}$ may be set to 24 milliseconds. Accordingly, the turn-off delay circuit 218 may be disconnected from the AC power source 102 and there may be no leakage path for current through the switching circuit 200. The turn-off delay time $T_{DELAY-OFF}$ may be configurable and may have a different value when the line voltage has a different magnitude.

Figure 3:
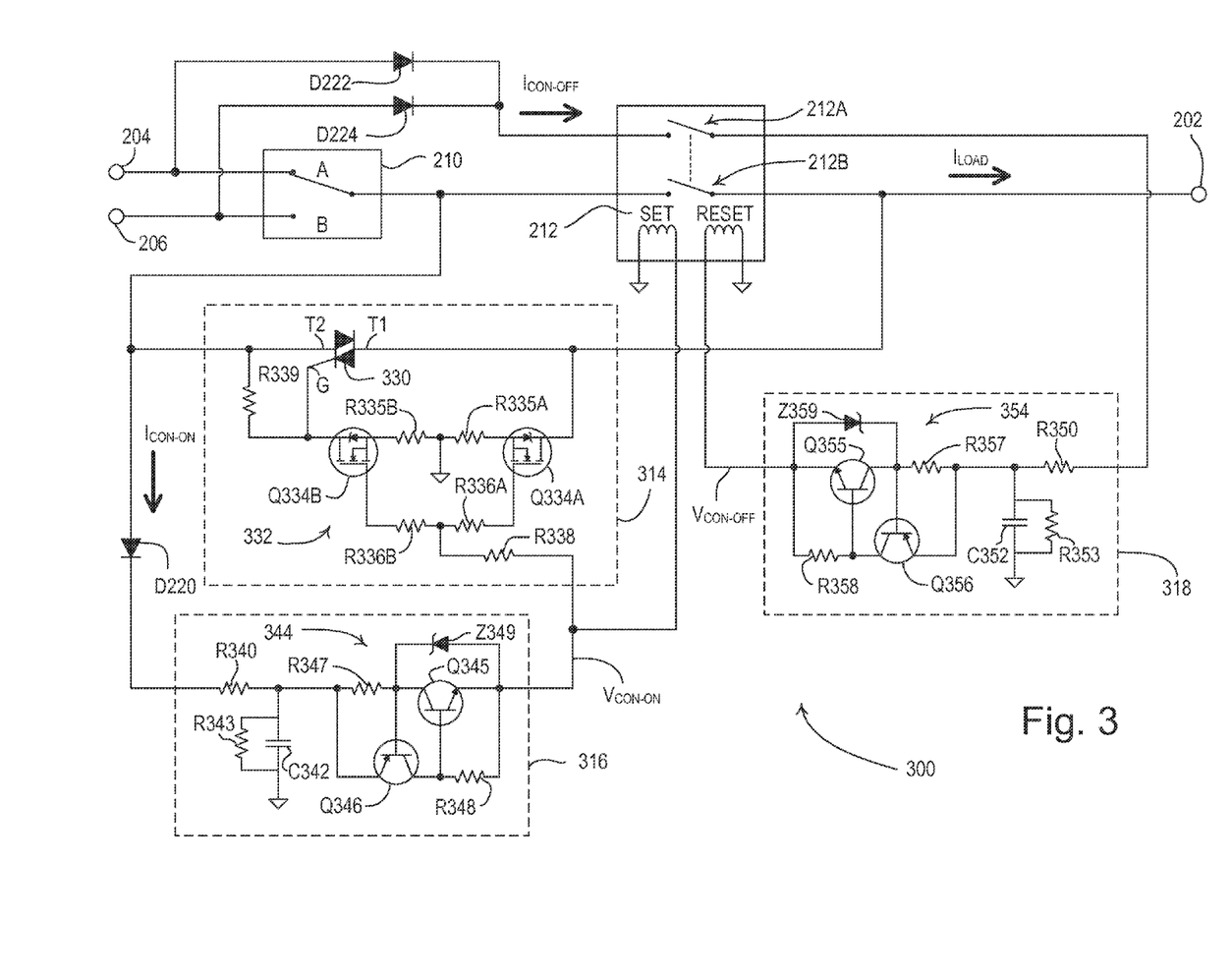
FIG. 3 is a simplified schematic diagram of an example three-way switching circuit.

FIG. 3 is a simplified example schematic diagram of a three-way switching circuit 300. The three-way switching circuit 300 may be an example of the three-way switching circuit 200. The three-way switching circuit 300 may include a bidirectional semiconductor switch 314. The bidirectional semiconductor switch 314 may be an example of the bidirectional semiconductor switch 214. The bidirectional semiconductor switch 314 may comprise a thyristor (e.g., a triac 330). The triac 330 may be coupled in parallel with the relay 212 and a gate coupling circuit 332 (e.g., a triac drive circuit).

The gate coupling circuit 332 may receive a turn-on signal $V_{CON-ON}$. The gate coupling circuit 332 may conduct a pulse of gate current through a gate terminal G of the triac 330, for example to render the triac 330 conductive. The gate coupling circuit 332 may comprise a voltage-controlled controllably conductive device. The voltage-controlled controllably conductive device may include two MOS-gated transistors (e.g., FETs Q334A, Q334B). FETs Q334A, Q334B may be coupled in anti-series connection between the gate terminal G and a main load terminal T1 of the triac 330. The FETs Q334A, Q334B may comprise metal-oxide semiconductor FETs (MOSFETs) or any suitable voltage-controlled semiconductor switches, for example IGBTs. The voltage-controlled controllably conductive device may comprise a FET or an IGBT in a full-wave rectifier bridge.

The sources of the FETs Q334A, Q334B may be coupled together through two source resistors R335A, R335B (e.g., each may have a resistance of approximately 12.4Ω). The junction of the two resistors R335A, R335B may be coupled to circuit common. The source resistors R335A, R335B may operate to limit the magnitude of the pulses of gate current conducted through the gate of the triac 330 to a maximum gate current (e.g., approximately 0.6 amp). The gates of the FETs Q334A, Q334B may be coupled to respective gate resistors R336A, R336B (e.g., each may have a resistance of approximately 47Ω). The junction of the gate resistors R336A, R336B may be coupled to a resistor R338 that may receive the turn-on signal $V_{CON-ON}$ at a control input and may have a resistance of approximately 10 kΩ. The gate terminal G of the triac 330 may be coupled to another main load terminal T2 of the triac 330 through a resistor R339 (e.g., having a resistance of approximately 100Ω).

The gate coupling circuit 332 may conduct substantially no net average current through the control input, for example, because the gate coupling circuit 332 comprises the FETs Q334A, Q334B. The gate coupling circuit 332 may render the triac 330 conductive and/or maintain the triac 330 conductive, for example, by conducting substantially no net average current through the control input. Substantially no net average current may refer to an amount of current appropriate to charge the input capacitances of the gates of the FETs Q334A, Q334B or other suitable switching devices of the gate coupling circuit 332. For example, substantially no net average current may refer to a current that is less than approximately one microamp.

The switching circuit 300 may include a turn-on delay circuit 316. The turn-on delay circuit 316 may be an example of the turn-on delay circuit 216. The turn-on delay circuit 316 may comprise an RC circuit. The RC circuit may have a resistor R340 and a capacitor C342. The resistor R340 may have a resistance of approximately 1.2 kΩ. The capacitor C342 may have a capacitance of approximately 100 μF. The turn-on delay circuit 316 may comprise a trigger circuit 344. The trigger circuit 344 may include an NPN bipolar junction transistor Q345, a PNP bipolar junction transistor Q346, two resistors R347, R348 and a zener diode Z349. The resistors R347, R348 may have a resistance of approximately 1 kΩ. The zener diode Z349 may have a breakover voltage of approximately 30 V.

The trigger circuit 344 may become conductive. The trigger circuit 344 may cause current to conduct through the control input of the gate coupling circuit 332, for example, when the trigger circuit 344 becomes conductive. The trigger circuit 344 may cause current to flow to the SET coil of the relay 212, for example, when the trigger circuit 344 becomes conductive. The relay 212 may be rendered conductive when the trigger circuit 344 sends current to the SET coil of the relay 212. The relay 212 may conduct the load current $I_{LOAD}$ when the relay 212 is rendered conductive. The trigger circuit 344 may become conductive when the voltage across the capacitor C342 exceeds approximately the breakover voltage of the zener diode Z349.

The mechanical switch 212A of the relay 212 may remain non-conductive until the voltage across the capacitor C342 exceeds approximately the breakover voltage of the zener diode Z349. The voltage across the capacitor C342 may be approximately zero volts, for example when the light source 104 is off. The voltage across the capacitor C342 may gradually increase when either the external three-way switch 106 or the internal three-way switch 210 is actuated to turn on the light source 104. It may take a certain amount of time for the voltage across the capacitor C342 to exceed the breakover voltage of the zener diode Z349. The time that it takes for the voltage across the capacitor C342 to exceed the breakover voltage of the zener diode Z349 may be referred to as a turn-on delay time $T_{DELAY-ON}$.

By maintaining the mechanical switch 212A of the relay 212 in a non-conductive state during the turn-on delay time $T_{DELAY-ON}$, the mechanical switch 212A of the relay 212 may not conduct the large in-rush current that arises upon receiving an input to turn on the light source 104. The turn-on delay time $T_{DELAY-ON}$ provided by the capacitor C342, the resistor R340, the resistor R343, and/or the trigger circuit 344 may prevent arcing at the mechanical switch 212A of the relay 212, for example by allowing the large in-rush current to be diverted away from the relay 212 while the movable contacts of the mechanical switches 212A, 212B may still be bouncing.

The switching circuit 300 may include a turn-off delay circuit 318. The turn-off delay circuit 318 may be an example of the turn-off delay circuit 218. The turn-off delay circuit 318 may comprise an RC circuit. The RC circuit may have a resistor R350 and a capacitor C352. The resistor R350 may have a resistance of approximately 1.2 kΩ. The capacitor C352 may have a capacitance of approximately 100 µF. The turn-off delay circuit 318 may comprise a trigger circuit 354. The trigger circuit 354 may include an NPN bipolar junction transistor Q355, a PNP bipolar junction transistor Q356, two resistors R357, R358 and a zener diode Z359. The resistors R357, R358 may have a resistance of approximately 1 kΩ. The zener diode Z359 may have a breakover voltage of approximately 30 V.

The trigger circuit 354 may become conductive, which may cause current to flow to the RESET coil of the relay 212. The mechanical switch 212A of the relay 212 may be rendered non-conductive when the trigger circuit 354 sends current to the RESET coil of the relay 212. The mechanical switch 212A of the relay 212 may not conduct the load current $I_{LOAD}$ when the relay 212 is rendered non-conductive. The trigger circuit 354 may become conductive when the voltage across the capacitor C352 exceeds approximately the breakover voltage of the zener diode Z359.

The mechanical switch 212A of the relay 212 may remain conductive until the voltage across the capacitor C352 exceeds approximately the breakover voltage of the zener diode Z359. The voltage across the capacitor C352 may be approximately zero volts, for example when the light source 104 is on. The voltage across the capacitor C352 may gradually increase when either the external three-way switch 106 or the internal three-way switch 210 is actuated to turn off the light source 104. It may take a certain amount of time for the voltage across the capacitor C352 to exceed the breakover voltage of the zener diode Z359. The time that it takes for the voltage across the capacitor C352 to exceed the breakover voltage of the zener diode Z359 may be referred to as a turn-off delay time $T_{DELAY-OFF}$.

The turn-off delay time $T_{DELAY-OFF}$ may be configurable by adjusting one or more components of the turn-off delay circuit 218. For example, the turn-off delay time $T_{DELAY-OFF}$ may be increased by selecting a zener diode Z359 that has a higher breakover voltage. The turn-off delay time $T_{DELAY-OFF}$ may be decreased by selecting a zener diode Z359 that has a lower breakover voltage. The turn-off delay time $T_{DELAY-OFF}$ provided by the capacitor C352, the resistor R340, the resistor R343, and the trigger circuit 354 may prevent arcing at the mechanical switch 212A of the relay 212, for example by allowing the load current $I_{LOAD}$ to subside before the mechanical switches 212A, 212B are opened to render the relay 212 non-conductive.

What is claimed is:

1. A load control device adapted to be coupled to a circuit comprising an AC power source, an electrical load, and an external single-pole double-throw (SPDT) three-way switch, the external three-way switch comprising a first fixed contact, a second fixed contact, and a movable contact adapted to be coupled to either the AC power source or the electrical load, and the external three-way switch comprising a first state in which the movable contact is contacting the first fixed contact and a second state in which the movable contact is contacting the second fixed contact, the load control device comprising:
    a first terminal adapted to be coupled to the other of the AC power source or the electrical load to which the three-way switch is not coupled so as to complete the circuit;
    a second terminal adapted to be coupled to the first fixed contact of the external three-way switch;
    a third terminal adapted to be coupled to the second fixed contact of the external three-way switch; and
    a switching circuit comprising:
        an internal SPDT switch comprising a movable contact and two fixed contacts coupled to the respective second and third terminals;
        a relay comprising a first mechanical switch coupled in series between the first terminal and the movable contact of the internal SPDT switch;
        a turn-on delay circuit responsive to a voltage at the movable contact of the internal SPDT switch, the turn-on delay circuit adapted to render the relay conductive after a turn-on delay from when either the internal SPDT switch is actuated to turn on the electrical load or the external three-way switch is actuated to turn on the electrical load; and
        a turn-off delay circuit responsive to voltages at both of the fixed contacts of the internal SPDT switch, the turn-off delay circuit adapted to render the relay non-conductive after a turn-off delay from when either the internal SPDT switch is actuated to turn off the electrical load or the external three-way switch is actuated to turn off the electrical load.

2. The load control device of claim 1, further comprising:
    a bidirectional semiconductor switch coupled in parallel with the first mechanical switch of the relay, the turn-on delay circuit configured to render the bidirectional semiconductor switch conductive after the turn-on delay from when either the internal SPDT switch is actuated to turn on the electrical load or the external three-way switch is actuated to turn on the electrical load;

wherein the relay is adapted to become conductive after the bidirectional semiconductor switch is rendered conductive.

3. The load control device of claim 2, wherein the bidirectional semiconductor switch comprises a thyristor coupled in parallel with the relay and a gate coupling circuit arranged to conduct gate current through a gate terminal of the thyristor in response to a drive voltage received at a control input of the gate coupling circuit.

4. The load control device of claim 3, wherein the gate coupling circuit comprises two MOS-gated transistors coupled in anti-series connection between the gate terminal and a load terminal of the thyristor.

5. The load control device of claim 4, wherein the two MOS-gated transistors comprise MOSFETs.

6. The load control device of claim 5, wherein the gate coupling circuit is adapted to conduct, through the control input, current to charge input capacitances of the gates of the MOSFETs when the turn-on delay circuit renders the gate coupling circuit conductive.

7. The load control device of claim 3, wherein the thyristor comprises a triac.

8. The load control device of claim 3, wherein the gate coupling circuit is adapted to conduct approximately no net average current through the control input in order to render the thyristor conductive and maintain the thyristor conductive.

9. The load control device of claim 3, wherein the gate coupling circuit is adapted to conduct an average current of less than one microamp through the control input in order to render the thyristor conductive and maintain the thyristor conductive.

10. The load control device of claim 2, wherein the turn-on delay circuit is configured to render the relay conductive after the turn-on delay plus a hardware delay from when either the internal SPDT switch is actuated to turn on the electrical load or the external three-way switch is actuated to turn on the electrical load.

11. The load control device of claim 1, further comprising:
an on/off actuator operable to actuate the internal SPDT switch.

12. The load control device of claim 11, further comprising:
an intensity adjustment actuator; and
a control circuit configured to generate an intensity control signal in response to the intensity adjustment actuator.

13. The load control device of claim 12, wherein the control circuit comprises a 0-10V control circuit.

14. The load control device of claim 1, wherein the turn-on delay circuit is coupled to the movable contact of the internal SPDT switch through a first diode, and the turn-off delay circuit is coupled to both of the fixed contacts of the internal SPDT switch through respective second and third diodes.

15. The load control device of claim 14, wherein the relay comprises a double-pole single-throw (DPST) relay and the DPST relay further comprises a second mechanical switch, and wherein the turn-off delay circuit is coupled to both of the fixed contacts of the internal SPDT switch through the second mechanical switch of the DPST relay and the respective second and third diodes.

16. The load control device of claim 1, wherein the relay comprises a latching relay, and wherein the turn-on delay circuit is coupled to a SET coil of the relay and the turn-off delay circuit is coupled to a RESET coil of the relay.

17. A three-way switching circuit for a load control device, the three-way switching circuit comprising:
a first terminal, a second terminal, and a third terminal;
a single-pole double-throw (SPDT) switch comprising:
a first contact connected to the first terminal,
a second contact connected to the second terminal, and
a pole comprising a first end and a second end, the first end movable between the first contact and the second contact of the SPDT switch;
a relay comprising a mechanical switch coupled in series electrical connection between the third terminal and the second end of the pole of the SPDT switch; and
a turn-off delay circuit adapted to be responsive to voltages at the first contact and the second contact of the SPDT switch, the turn-off delay circuit being configured to:
detect an actuation of the pole of the SPDT switch to stop a load current from being conducted through the SPDT switch;
start a timer upon the actuation of the pole of the SPDT switch; and
open the mechanical switch of the relay in response to an expiration of the timer to stop the load current from being conducted through the third terminal.

18. The three-way switching circuit of claim 17, further comprising a turn-on delay circuit adapted to be responsive to a voltage at the pole of the SPDT switch, the turn-on delay circuit being configured to:
detect an actuation of the pole of the SPDT switch to allow the load current to be conducted through the SPDT switch;
start a second timer upon the actuation of the pole of the SPDT switch; and
close the mechanical switch of the relay in response to an expiration of the second timer to allow the load current to be conducted through the third terminal.

19. The three-way switching circuit of claim 18, further comprising:
a bidirectional semiconductor switch coupled in parallel with the mechanical switch of the relay, the turn-on delay circuit configured to render the bidirectional semiconductor switch conductive after the expiration of the second timer;
wherein the relay is adapted to become conductive after the bidirectional semiconductor switch is rendered conductive.

20. The three-way switching circuit of claim 19, wherein the bidirectional semiconductor switch comprises a thyristor coupled in parallel with the relay and a gate coupling circuit arranged to conduct gate current through a gate terminal of the thyristor in response to a drive voltage received at a control input of the gate coupling circuit.

21. The three-way switching circuit of claim 20, wherein the gate coupling circuit comprises two MOS-gated transistors coupled in anti-series connection between the gate terminal and a load terminal of the thyristor.

22. The three-way switching circuit of claim 21, wherein the two MOS-gated transistors comprise MOSFETs.

23. The three-way switching circuit of claim 22, wherein the gate coupling circuit is adapted to conduct, through the control input, current to charge input capacitances of the gates of the MOSFETs when the turn-on delay circuit renders the gate coupling circuit conductive.

24. The three-way switching circuit of claim 20, wherein the thyristor comprises a triac.

25. The three-way switching circuit of claim 20, wherein the gate coupling circuit is adapted to conduct approximately no net average current through the control input in order to render the thyristor conductive and maintain the thyristor conductive.

26. The three-way switching circuit of claim 20, wherein the gate coupling circuit is adapted to conduct an average current of less than one microamp through the control input in order to render the thyristor conductive and maintain the thyristor conductive.

27. The three-way switching circuit of claim 18, wherein the turn-on delay circuit is coupled to the pole of the SPDT switch through a first diode, and the turn-off delay circuit is coupled to the first and second contacts of the internal SPDT switch through respective second and third diodes.

28. The three-way switching circuit of claim 27, wherein the relay comprises a double-pole single-throw (DPST) relay and the DPST relay further comprises a second mechanical switch, and wherein the turn-off delay circuit is coupled to the first and second contacts of the SPDT switch through the second mechanical switch of the DPST relay and the respective second and third diodes.

29. The three-way switching circuit of claim 18, wherein the relay comprises a latching relay, and wherein the turn-on delay circuit is coupled to a SET coil of the relay and the turn-off delay circuit is coupled to a RESET coil of the relay.

30. The three-way switching circuit of claim 17, wherein the three-way switching circuit is adapted to be interfaced between an electrical load and an external single-pole double-throw (SPDT) switch or between an AC power source and the external SPDT switch, the external SPDT switch comprising a first fixed contact, a second fixed contact, and a movable contact.

31. The three-way switching circuit of claim 30, wherein the first terminal is adapted to connect to the first fixed contact, the second terminal is adapted to connect to the second fixed contact, and the third terminal is adapted to connect to the electrical load when the three-way switching circuit is adapted to be interfaced between the electrical load and the external SPDT switch, and wherein the first terminal is adapted to connect to the first fixed contact, the second terminal is adapted to connect to the second fixed contact, and the third terminal is adapted to connect to an AC power source when the three-way switching circuit is adapted to be interfaced between the AC power source and the external SPDT switch.

32. A method for controlling a light source, the method comprising:

receiving an input via a single-pole double-throw (SPDT) switch to turn off the light source;
starting a turn-off delay time in response to receiving the input to turn off the light source;
interrupting the flow of a load current conducting through a relay to the light source upon receiving the input to turn off the light source;
determining that the turn-off delay time has expired; and
resetting the relay to render the relay non-conductive in response to the turn-off delay time expiring.

33. The method of claim 32, wherein resetting the relay comprises:
generating a turn-off signal at a turn-off delay circuit; and
sending the turn-off signal to a reset input of the relay to render the relay non-conductive.

34. The method of claim 33, wherein generating the turn-off signal comprises conducting a turn-off delay current through the turn-off delay circuit, the turn-off delay current being smaller than the load current.

35. The method of claim 33, further comprising:
receiving a second input via an external single-pole double-throw (SPDT) three-way switch to turn on the light source;
starting a turn-on delay time in response to receiving the input to turn on the light source;
generating a turn-on signal at a turn-on delay circuit;
sending the turn-on signal to a set input of the relay to render the relay conductive;
determining that the turn-on delay time has expired; and
conducting a load current from a power source to the light source via the relay in response to the turn-on delay time expiring.

36. The method of claim 35, further comprising conducting the load current via an alternative path until the turn-on delay time expires.

37. The method of claim 36, wherein conducting the load current via the alternative path comprises conducting the load current through a bidirectional semiconductor switch that is connected, in parallel with the relay, between the power source and the light source.

* * * * *